(12) United States Patent
Huntley

(10) Patent No.: US 9,127,707 B1
(45) Date of Patent: Sep. 8, 2015

(54) TROLLING MOTOR LIFT CORD APPARATUS

(71) Applicant: Jeffery William Huntley, Madison, AL (US)

(72) Inventor: Jeffery William Huntley, Madison, AL (US)

(73) Assignee: T-H MARINE SUPPLIES, INC., Huntsville, AL (US)

( * ) Notice: Subject to any disclaimer, the term of this patent is extended or adjusted under 35 U.S.C. 154(b) by 105 days.

(21) Appl. No.: 13/801,796

(22) Filed: Mar. 13, 2013

(51) Int. Cl.
*B63H 20/10* (2006.01)
*F16C 1/12* (2006.01)

(52) U.S. Cl.
CPC *F16C 1/12* (2013.01); *B63H 20/10* (2013.01); *B63H 2020/103* (2013.01)

(58) Field of Classification Search
USPC .......... 74/502.2, 543; 16/428; 123/185.3, 123/185.4, 185.2; 440/53, 62, 63; 441/69
See application file for complete search history.

(56) References Cited

U.S. PATENT DOCUMENTS

| | | | | |
|---|---|---|---|---|
| 3,724,790 A | * | 4/1973 | Harris et al. | 248/642 |
| 4,212,175 A | * | 7/1980 | Zakow | 70/58 |
| 4,607,577 A | * | 8/1986 | Leonardo | 108/146 |
| 5,112,258 A | * | 5/1992 | Folsom | 440/63 |
| 5,351,365 A | * | 10/1994 | Hauck | 16/422 |
| 5,358,292 A | * | 10/1994 | Van Wiebe et al. | 292/235 |
| 7,341,544 B2 | * | 3/2008 | St. George et al. | 482/82 |
| 8,020,257 B2 | | 9/2011 | Merten et al. | |
| 2006/0105893 A1 | | 5/2006 | Chen | |

OTHER PUBLICATIONS

Invincible Marine Trolling Motor Pull Cord; printed from Internet. Mfg. Name: MINN; Mfg. PN: MKA-45; SKU: 2252001; printed from Internet.
Photographs of various handles that may be prior art.
Good Vibrations; Start Me Up; www.gvpower.com; retrieved Apr. 7, 2014 using <URL> http://www.gvpower.com/product_detail.php?productid=Start%20Me%20Up&ppid=7&popt=0&popt2=0#.
Good Vibrations; Get-A-Grip; www.gvpower.com; retrieved Apr. 25, 2014 using <URL> http://www.gvpower.com/product_detail.php?productid=Get-A-Grip&ppid=495&popt=0&popt2=0.
Good Vibrations; Essential Hardware; www.gvpower.com; retrieved Apr. 7, 2014 using <URL> http://www.gvpower.com/essentialhardware.com/product_detail.php?pid=153987&gdftrk=gdfV28536_a_7c11872_a_7c153987&glcid=CMacx4z0 . . . .

* cited by examiner

*Primary Examiner* — Thomas Diaz
(74) *Attorney, Agent, or Firm* — Stephen H. Hall; Bradley Arant Boult Cummings LLP

(57) ABSTRACT

An improved trolling motor lift cord apparatus for assisting in the moving of a trolling motor between a lowered position and a raised position. The improved trolling motor lift cord apparatus includes a flexible, high-strength, cord-like member that engages the trolling motor locking mechanism and a handle end for the user to grasp and pull.

4 Claims, 6 Drawing Sheets

TROLLING MOTOR LIFT CORD APPARATUS

FIELD OF THE INVENTION

The invention relates generally to a trolling motor and more specifically relates to an improved trolling motor lift cord apparatus for assisting in the raising and lowering of a trolling motor between a lowered position and a raised position.

BACKGROUND ART

Trolling motors are devices commonly used by fishermen to quietly and slowly propel boats over bodies of water. Trolling motors have been in use for a number of years. Trolling motors are normally positioned on the bow of a boat, using a fixed mount that allows the trolling motor to be lowered into and raised out of the water. The raising and lowering of the trolling motor has traditionally been accomplished with a lift cord device comprised of a length of rope threaded through an opening on the trolling motor frame and attached to the eyelet of the trolling motor locking mechanism on one end, and a simple handle on the other end for the user to grasp and pull. To lift the trolling motor the user must pull on the lift cord, which disengages a locking mechanism, often referred to as a lockslide pin, and then continue pulling the cord until the trolling motor fully folds into the desired position. The conventional lift cord device is made of standard rope constructed from braided or twisted natural fibers (such as cotton, hemp, etc.) or man-made fibers (such as nylon, polypropylene, polyester, etc.).

The lift cord is typically connected to the trolling motor by passing it through a hole in the locking mechanism and tying a knot to secure it. On the end of the lift cord opposite the trolling motor locking mechanism there is normally a lifting handle. The handle of the conventional lift cord is a simple oblong device constructed of a rigid plastic or wood that fits into the palm of the user's hand. The handle is typically connected to the lift cord by passing the lift cord through a hole in the handle and securing it within a cavity in the handle by tying a knot that prevents the lift cord from passing back through the hole in the handle. In this format, the cord and handle form a T-shape, with the cord passing through a user's fingers when the user grips the handle. To the present, seemingly all trolling motors have been manufactured with this standard lift cord comprised of rope and a simple handle.

One problem with the conventional trolling motor lift cord and the replacement lift cords available prior to the present invention is the fact that the lift cord often breaks. Because of the materials traditionally used in manufacturing trolling motor lift cords, prolonged use of the cords frequently results in cord breakage. Moreover, in the past few years trolling motors have grown in size and weight, which has put further stress on the conventional lift cord. As a result, lift cord breakage occurs even more frequently than ever before. If the cord breaks, it is very difficult for the user to lift the trolling motor out of the water. This can create a dangerous situation where the user is bending over the edge of the boat in an attempt to lift the trolling motor, which could result in the user falling into the water and drowning. This also creates a dangerous situation in that the user cannot drive the boat under the power of the main engine with the trolling motor in the down position, since this would create a damaging scenario for the trolling motor and the hull of the boat, which could cause injury or death to the user.

Another problem with the conventional cord and other attempts at using different cord materials, is that the attachment of the cord to the trolling motor is difficult, time consuming, and costly. Although traditional cord materials may be relatively easy to tie into a knot, confined spaces may make tying a knot to the locking mechanism difficult. Additionally, the tightly enclosed and confined spaces surrounding the trolling motor locking mechanism make the use of tools or brackets difficult, making replacement of the conventional lift cord complicated and potentially dangerous when the user is on a boat in the water.

Another problem with the conventional cord is that the handle of the standard trolling motor lift cord is a simple oblong handle made of rigid material that fits into the user's palm. The conventional handle does not have a soft, padded surface to help cushion the hand of the user from the force required to lift the heavy trolling motor. Additionally, because the conventional cord passes between the user's fingers, the cord can cause cuts or abrasions on the user's fingers.

Another problem with the conventional cord is that the rope by nature will stretch when under load of being pulled. This stretching of the cord causes the user to exert more force and work harder to disengage the locking pin of the trolling motor and lift the trolling motor to the upright position.

The problems related to conventional trolling motor lift cord breakage have been recognized by others in the field, including U.S. Pat. No. 6,808,431 to Neely. However, Neely and others in the prior art address the problem through other mechanical assemblies that can be used if the cord breaks rather than solving the underlying problem. There are no known examples of patented trolling motor lift cord devices as set forth herein.

While the conventional lift cord may be suitable for its particular purpose for some amount of time, they are not a suitable long-term solution to serve in the moving of the heavy trolling motor from the lowered position to the raised position. Furthermore, conventional lift cords are not desirable as a replacement lift cord, due to the difficulty in replacing the conventional cord and due to the need to continually replace them as they break.

In these respects, the Improved Trolling Motor Lift Cord Apparatus according to the present invention substantially departs from the conventional concepts and designs of the prior art, and in so doing provides an apparatus primarily developed for the purpose of assisting in the moving of a trolling motor between a lowered position and a raised position, which is improved to ease installation, eliminate breakage, improve user comfort, and increase life of the product.

SUMMARY OF THE INVENTION

In view of the foregoing disadvantages inherent in the conventional type of trolling motor lift cords now present in the prior art, the present invention provides an improved trolling motor lift cord apparatus wherein the same can be used in the moving of a trolling motor between a lowered position and a raised position.

In one embodiment, the present trolling motor lift cord invention generally comprises a cable having a proximal end and a distal end, an attachment mechanism affixed to the distal end of the cable, and a handle connected to the proximal end of the cable. The attachment mechanism secures the present invention to the trolling motor locking mechanism. The user utilizes the present invention by holding the handle and pulling the trolling motor from a lowered position to a raised position and vice versa through force applied to the trolling motor lift cord of the present invention.

As the user pulls the trolling motor lift cord, the locking mechanism disengages from its locked position, allowing the user to raise or lower the trolling motor. Additional features of the present invention will be described hereinafter that will form the subject matter of the claims appended hereto.

In this respect, it should be understood that the present invention is not limited to the details of construction and to the arrangements of components set forth in the following description or illustrated in the drawings. The invention is capable of other embodiments and being practiced and carried out in various ways as would be recognized by someone having ordinary skill in the art. It is to be further understood that the terminology used herein is for the purpose of describing the invention and should not be considered as limiting the scope of the invention.

A primary object of the present invention is to provide an improved trolling motor lift cord device that will overcome the shortcomings of the prior art devices as described herein.

A second object of the present invention is to provide a trolling motor lift cord device that can be easily installed to replace the conventional trolling motor lift cord either on land or on the water.

Another object is to provide a trolling motor lift cord that is compatible with and can serve as a replacement part on all of the most commonly used trolling motor brands and models.

An additional object of the present invention is to provide a trolling motor lift cord device that is comfortable and reliable for the user.

Other objects and advantages of the present invention will become obvious to the reader and it is intended that these objects and advantages are within the scope of the present invention.

To the accomplishment of the above and related objects, this invention may be embodied in the form illustrated in the accompanying drawings, recognizing however, that the drawings are illustrative only, and that changes may be made in the specific construction illustrated and described within the scope of the appended claims.

BRIEF DESCRIPTION OF DRAWINGS

It should be noted that identical features in different drawings are shown with the same reference numeral. Various other objects, features and attendant advantages of the present invention will become fully appreciated as the same becomes better understood when considered in conjunction with the accompanying drawings.

DETAILED DESCRIPTION

Figure 1:
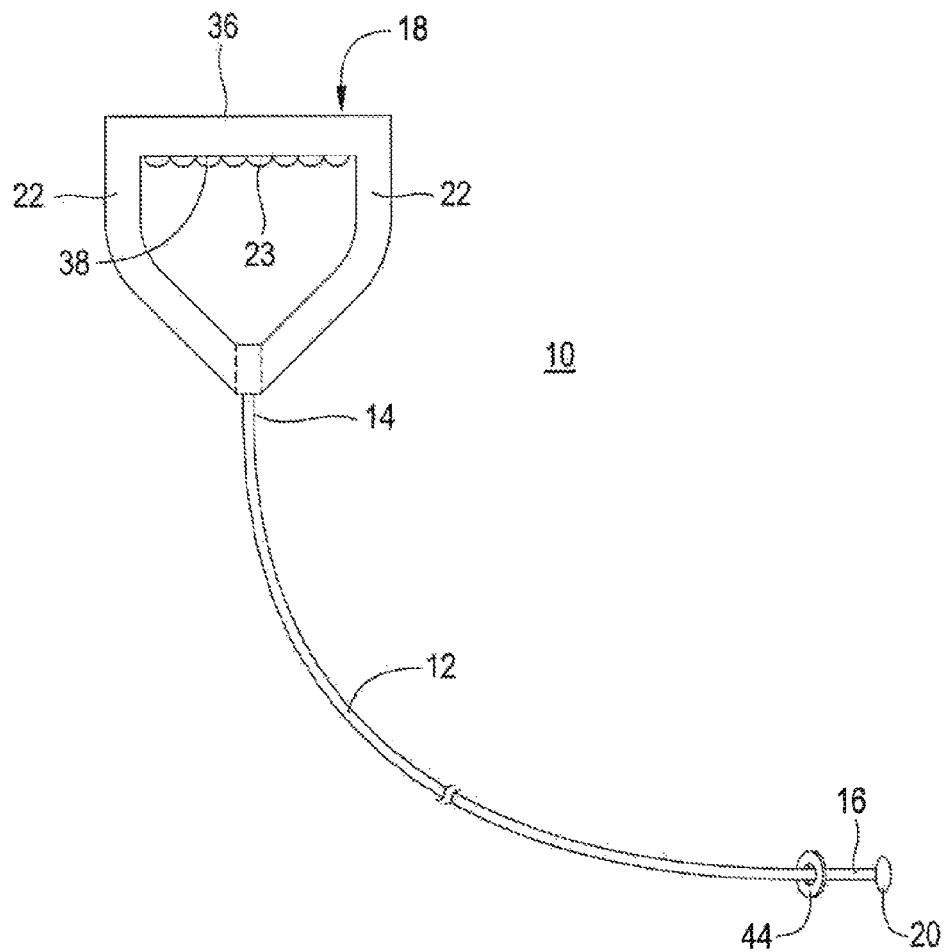
FIG. 1 is a top view of one embodiment of the present invention.

FIGS. 1 through 6 illustrate various views and embodiments of the present invention. In one embodiment, shown in FIG. 1, the trolling motor lift cord device 10 comprises a cable 12 having a proximal end 14 and a distal end 16, a handle 18 connected to the proximal end 14, and an attachment mechanism 20 affixed to the distal end 16. The handle 18 depicted in FIG. 1 is a full grip handle, having handle sides 22. The trolling motor lift cord device 10 is preferably capable for use on any trolling motor, including all of the most popular brands and models of trolling motors, such as MOTORGUIDE and MINN KOTA trolling motors.

The cable 12 is comprised of a flexible and bendable strand of material. The cable 12 is preferably comprised of a minimally stretchable, abrasion-resistant material such as metal wire or steel cable. In the preferred embodiment, the stretch (lengthening of cable as adjusted under the proposed maximum load) is less than 2% of the total cable 12 length, and more preferably less than 0.5% of the total length. The cable 12 can have a coating, cover, or jacket of nylon, polyester, polyethylene, polypropylene, or other plastic for additional abrasion resistance. Other abrasion-resistant materials capable of being formed into a flexible cable may be used. In a preferred embodiment, the cable 12 is comprised of 7×7 ³⁄₃₂" twisted or braided steel cable having a nylon coating. Other types of cable 12 can be used (e.g., 7×19 cable), and other sizes can be used (e.g., ¹⁄₁₆", ⁵⁄₆₄", and ⅛" are also preferred alternatives). Additionally, the cable 12 can be standard rope constructed from braided or twisted natural fibers (such as cotton, hemp, etc.) or man-made fibers (such as nylon, polypropylene, polyester, polyaramids, e.g. Kevlar®, polyimides, Dacron®, etc.), or other materials such as high molecular density polyethylene, Vectran® manufactured fiber, and Zylon® manufactured fiber. Such fibers may provide additional stretch, if desired. For example, nylon fibers may stretch 10-15%, Dacron® may stretch 3-5%, while Kevlar® may stretch 1-2%.

Figure 2:
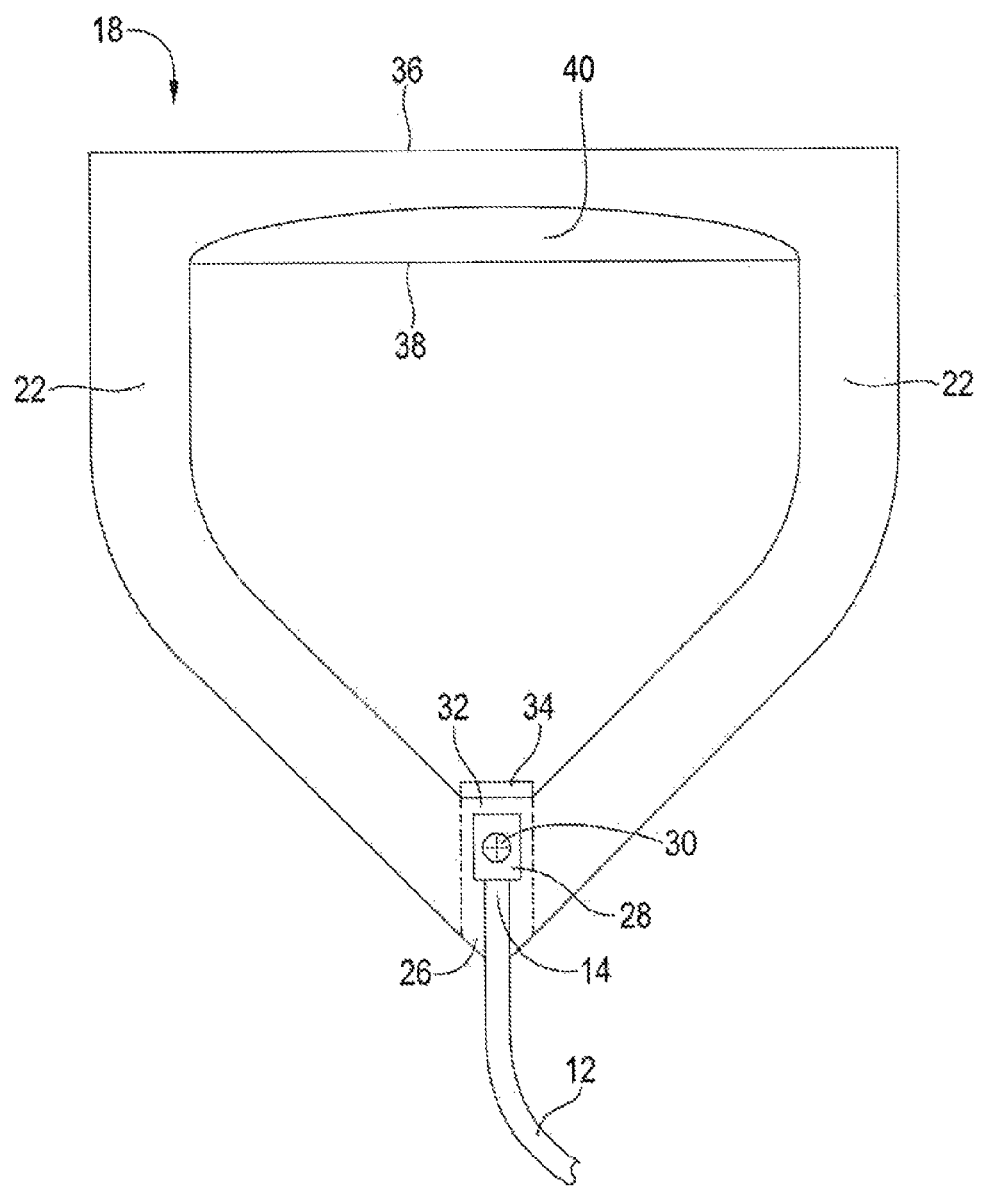
FIG. 2 is a cross-sectional view of one embodiment of the handle connected to the proximal end of the cable.
Figure 6:
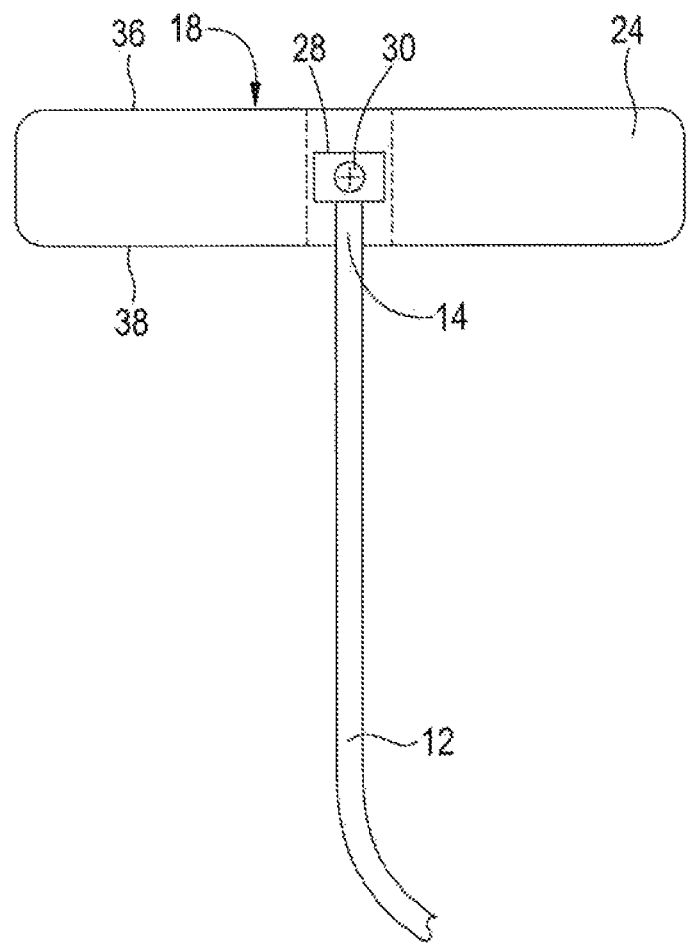
FIG. 6 is a front view of a T-grip alternate embodiment of the handle.

The handle 18 is connected to the proximal end 14 of the cable 12 as shown in FIG. 1. In the preferred embodiment, the handle 18 is a full grip handle 18, having handle sides 22 which enclose a user's fingers as shown in FIG. 1. It will be understood that in alternate embodiments, the handle 18 may also comprise a T-grip 24 as shown in FIG. 6. The handle 18 preferably comprises a one-piece structure, but it may also be comprised of two or more pieces that are mechanically fastened to form a single, unified handle. The handle 18 may have one or more ergonomic ridges 23 for finger placement on the handle. As shown in FIG. 2, the full grip handle 18 may have a palm side 36 that rests against the palm of the user's hand when used, and a finger side 38 that rests against the user's fingers when used. The handle 18 may be comprised of any conventional material, including plastic, wood, or metal. The handle 18 may also optionally include cushioned or foam material 40 to provide a softer surface for the user. The handle palm side 36, handle finger side 38, or both, could include the cushioned material 40.

The handle 18 is connected to the proximal end 14 of the cable 12. In one embodiment shown in FIG. 2, the cable 12 is threaded through a cable entry point 26 and a cable access point 32 in the handle 18. In the handle 18 of FIG. 2, there is a hollow core or channel that allows the cable 12 to be passed from the cable entry point 26 to the cable access point 32. After passing through the cable entry point 26 and the cable access point 32, a handle connector 28 is attached to the proximal end 14 of the cable 12. The handle connector 28 can be mechanically fastened with a fastening device 30 as illustrated in FIG. 2. As shown in FIG. 2, the entry point 26 is sufficiently wide to permit the cable 12 to pass through, but once the handle connector 28 is attached to the cable 12, the cable 12 can no longer pass through the entry point 26. Unlike the entry point 26, the cable access point 32 is sufficiently wide to permit the cable 12 and the handle connector 28 to pass through so that the user can access the cable 12 and handle connector 28.

The cable access point 32 may covered by a cable access cover 34. The cable access cover 34 can be one or more flexible flaps that are integral to the handle 18 through which the cable 12 can be pushed, or it can be a separate, removable cover or tab. The cable access point 32 may also remain open, without any cable access cover 34.

In one embodiment, the proximal end 14 of the cable 12 may be threaded through a washer 44 after being threaded through the cable entry point 26. If a washer 44 is used, the handle connector 28 is preferably larger than the opening in the washer 44 through which the proximal end 14 of the cable 12 is threaded. This configuration can better secure the cable 12 to the cable entry point 26.

In the preferred embodiment, the fastening device 30 comprises a set screw, but it will be understood that any suitable fastener may be employed to mechanically fasten the handle connector 28 to the cable 12. Additionally, the handle connector 28 may not require a separate fastening device 30, but could be directly attached to or engaging the cable 12, for example a crimp.

In one embodiment of the present invention, the handle connector 28 may be cylindrical in shape, and the hollow core or channel in the handle 18 is also cylindrical in shape. In that embodiment, the handle may spin or swivel a full 360° at the point of its connection to the cable 12. The handle 12 may be secured to the trolling motor 46 by using a hook and loop strap or other securing device, which may be preferred when the trolling motor is in its raised position.

Figure 3:
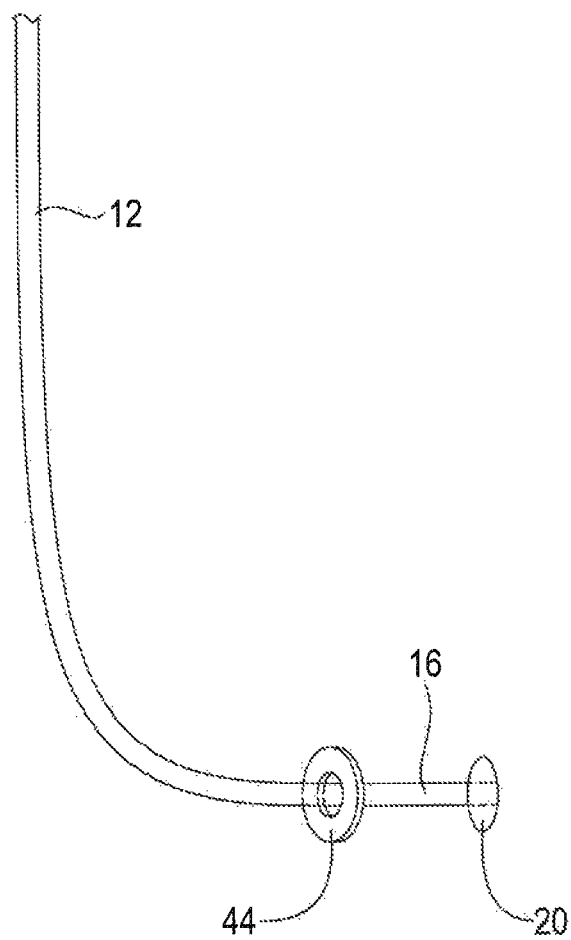
FIG. 3 is a side view of one embodiment of the attachment mechanism affixed to the distal end of the cable.
Figure 4:
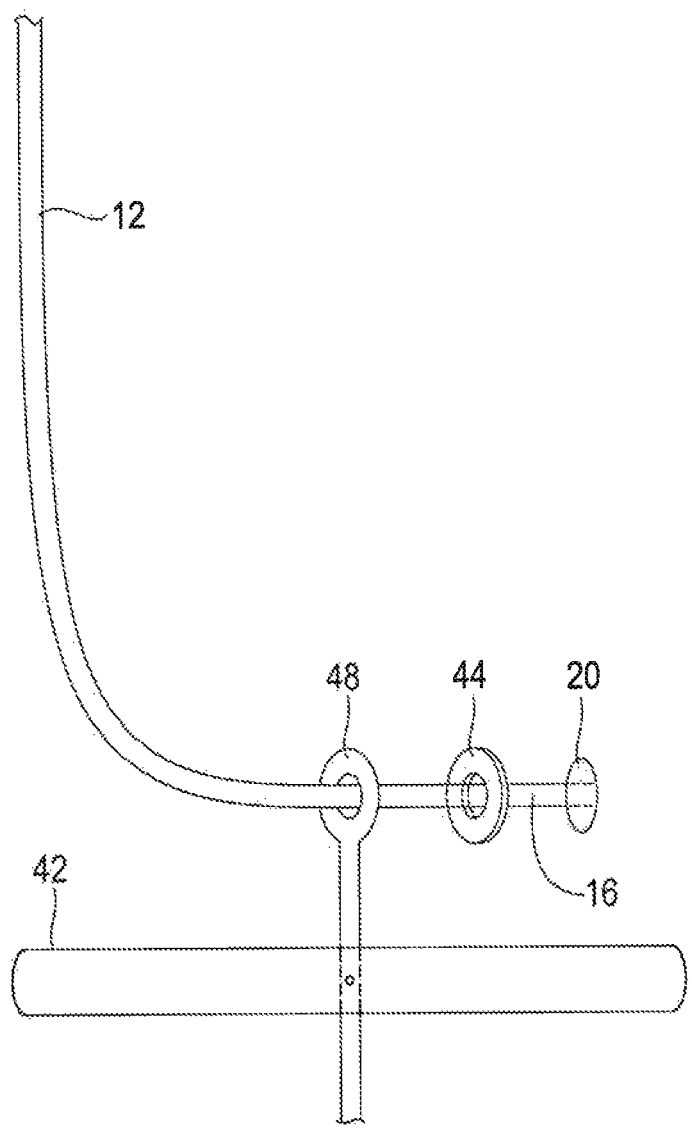
FIG. 4 is a perspective view of one embodiment of the distal end of the present invention connected to a trolling motor locking mechanism.

The distal end 16 of the cable 12 contains an attachment mechanism 20, shown in FIG. 3, which connects the trolling motor lift cord device 10 to a trolling motor locking mechanism 42 as shown in FIG. 4. The attachment mechanism 20 can be any fitting, device, or connection that is larger than the opening or eyelet 48 of the trolling motor locking mechanism 42, including a ball (as shown in FIGS. 1, 3, and 4), cone, T-shape, square, etc. Preferably the attachment mechanism 20 is made of metal. The attachment mechanism 20 can be attached to the distal end 16 of the cable 12 in any manner, including mechanically, using a separate fastening device 30, or directly attached to or engaging the cable 12, for example by crimp. The attachment mechanism 20 may be either temporarily or permanently attached to the distal end 16 of the cable 12.

In the embodiments shown in FIGS. 3 and 4, the cable 12 is threaded through a washer 44 prior to being threaded through the eyelet 48. In the preferred embodiment, the opening of the washer 44 through which the cable 12 is threaded is smaller than the size of the attachment mechanism 20, and better secures the attachment mechanism 20 against the eyelet 48 of the trolling motor locking mechanism 42. In alternate embodiments, the attachment mechanism 20 may comprise a carabiner, clip, U-joint, loop, hook, crimp, or any other device suitable to connect the distal end 16 of the cable 12 to the trolling motor locking mechanism 42.

Figure 5:
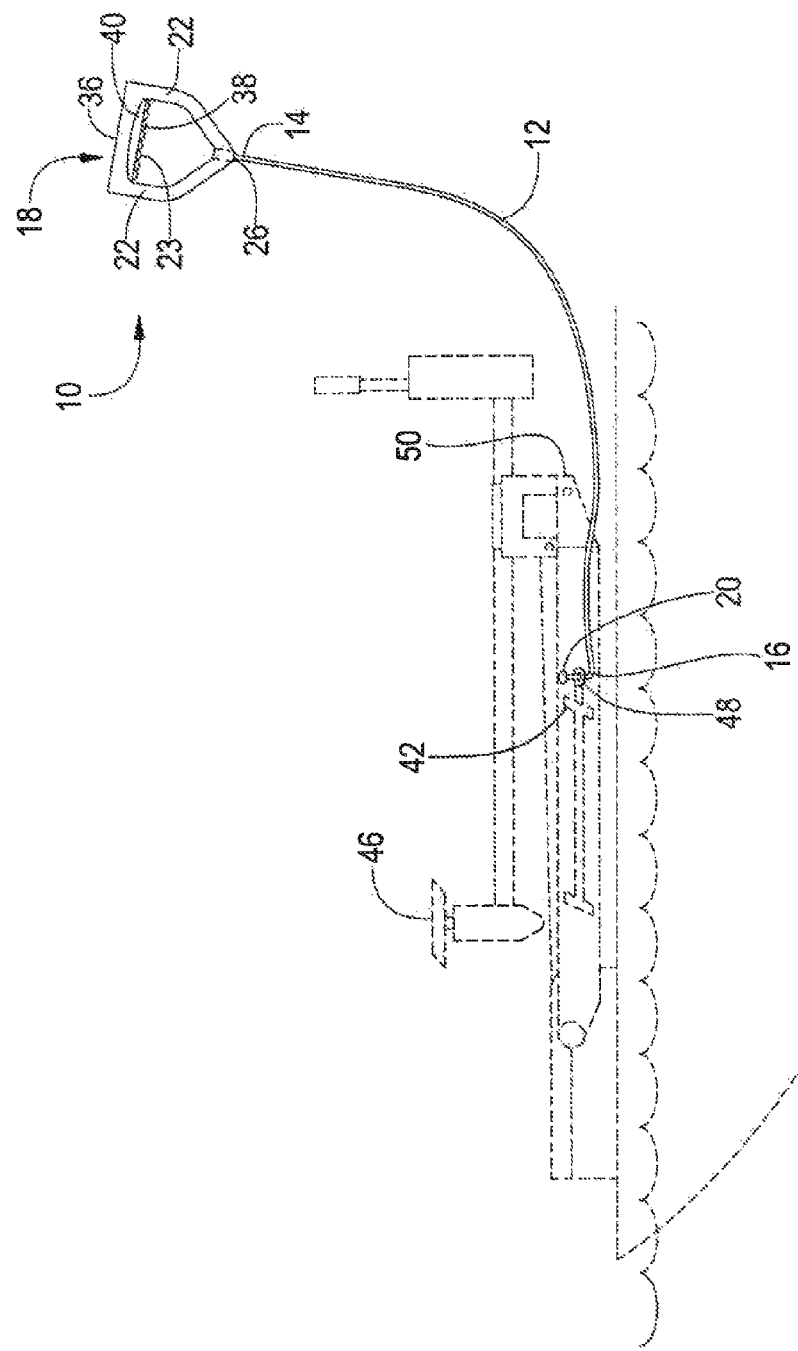
FIG. 5 is a side view of a boat showing one embodiment of the present invention connected to a trolling motor.

To install the preferred embodiment of the trolling motor lift cord device 10 on a trolling motor 46 as shown in FIG. 5, the proximal end 14 of the cable 12 is inserted through an eyelet 48 in the trolling motor locking mechanism 42 (no washer is used in this embodiment between the attachment mechanism 20 and the eyelet 48). The cable 12 is then pulled through the eyelet 48 in the trolling motor locking mechanism 42 until the proximal end 14 is out of the trolling motor mounting bracket 50 and the attachment mechanism 20 on the distal end 16 of the cable 12 engages the eyelet 48 of the trolling motor locking mechanism 42. In this embodiment, the attachment mechanism 20 is pre-attached, or integral to, the distal end 16 of the cable 12. Once the proximal end 14 of the cable 12 is clear of the trolling motor mounting bracket 50, the proximal end 14 is pushed through the cable entry point 26 of the handle 18. The proximal end 14 then passes through the handle 18 cavity and out of the cable access point 32.

After the proximal end 14 of the cable 12 passes out of the cable access point 32, the handle connector 28 is attached to the proximal end 14 of the cable 12, preventing the proximal end 14 from passing back through the cable entry point 26. If desired, a fastening device 30 may be utilized to connect the handle connector 28 to the proximal end 14 of the cable 12. The proximal end 14 of the cable 12 with the handle connector 28 is then pulled back through the cable access point 32 and into the handle 18 cavity, engaging and stopping at the cable entry point 26. A cable access cover 34 may then be optionally utilized to cover the cable access point 32.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A trolling motor lift cord device, comprising:
   a cable having a proximal end and a distal end, wherein said cable is comprised of a coated metal cable having a diameter between 1/32 of an inch and 1/8 of an inch;
   a handle connected to the proximal end of the cable, wherein said handle is a full grip handle having a handle palm side, and a handle finger side, and handle side arching downward from the handle palm side and coming together below the handle finger side and further wherein said handle finger side is comprised of a cushioned material, and further wherein said handle is connected to the proximal end of the cable with a handle connector having a hollow channel to receive the cable, said handle connector mechanically fastened to the cable using a set screw and wherein said handle connector is seated in a cavity in the handle between a cable access point and a cable entry point and where the cable access point is wider than the cable entry point and the cable and fastened handle connector is moveable out of the cable access point;
   a ball-shaped attachment mechanism connected to the distal end of the cable, wherein said attachment mechanism engages an eyelet of a trolling motor locking mechanism; and
   a washer having an internal opening smaller than the ball shaped locking mechanism and an external diameter larger than an eyelet of a trolling motor locking mechanism, wherein the ball-shaped attachment mechanism engages the washer and the washer engages the eyelet of the trolling motor locking mechanism.

2. The trolling motor lift cord device of claim 1, wherein said metal cable comprises nylon-coated braided steel.

3. The trolling motor lift cord device of claim 1, wherein said cushioned material is molded into ergonomic ridges.

4. The trolling motor lift cord device of claim 1, wherein said handle is comprised of a one-piece structure.

* * * * *